Louis W. Erath
Paul E. Madeley
INVENTORS

BY Thomas O Arnold

ATTORNEY

Louis W. Erath
Paul E. Madeley
INVENTORS

BY Thomas O Arnold

ATTORNEY

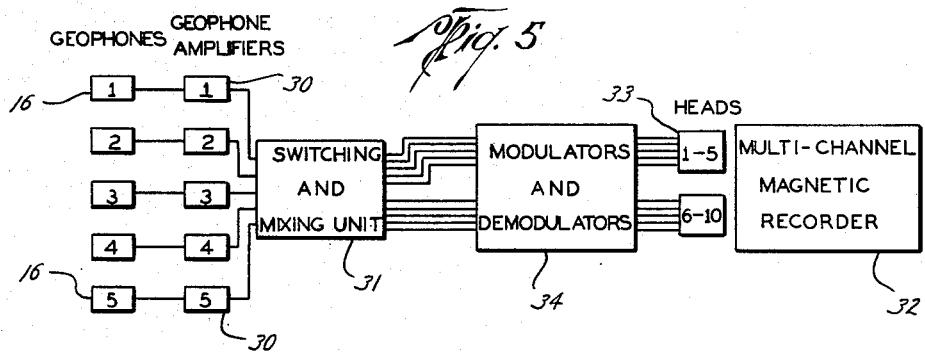
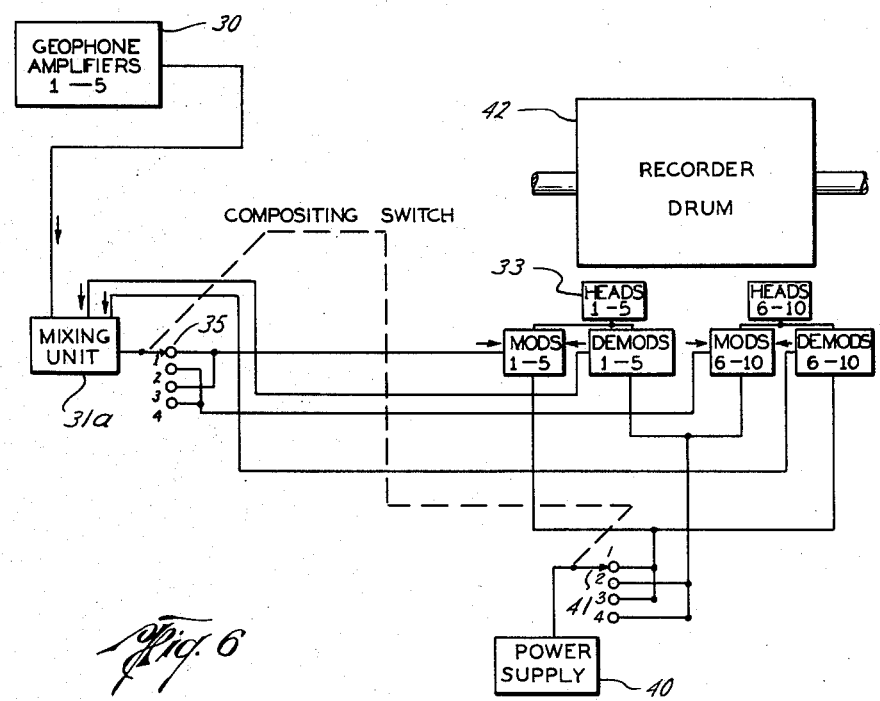
Louis W. Erath
Paul E. Madeley
INVENTORS
BY Thomas O. Arnold
ATTORNEY

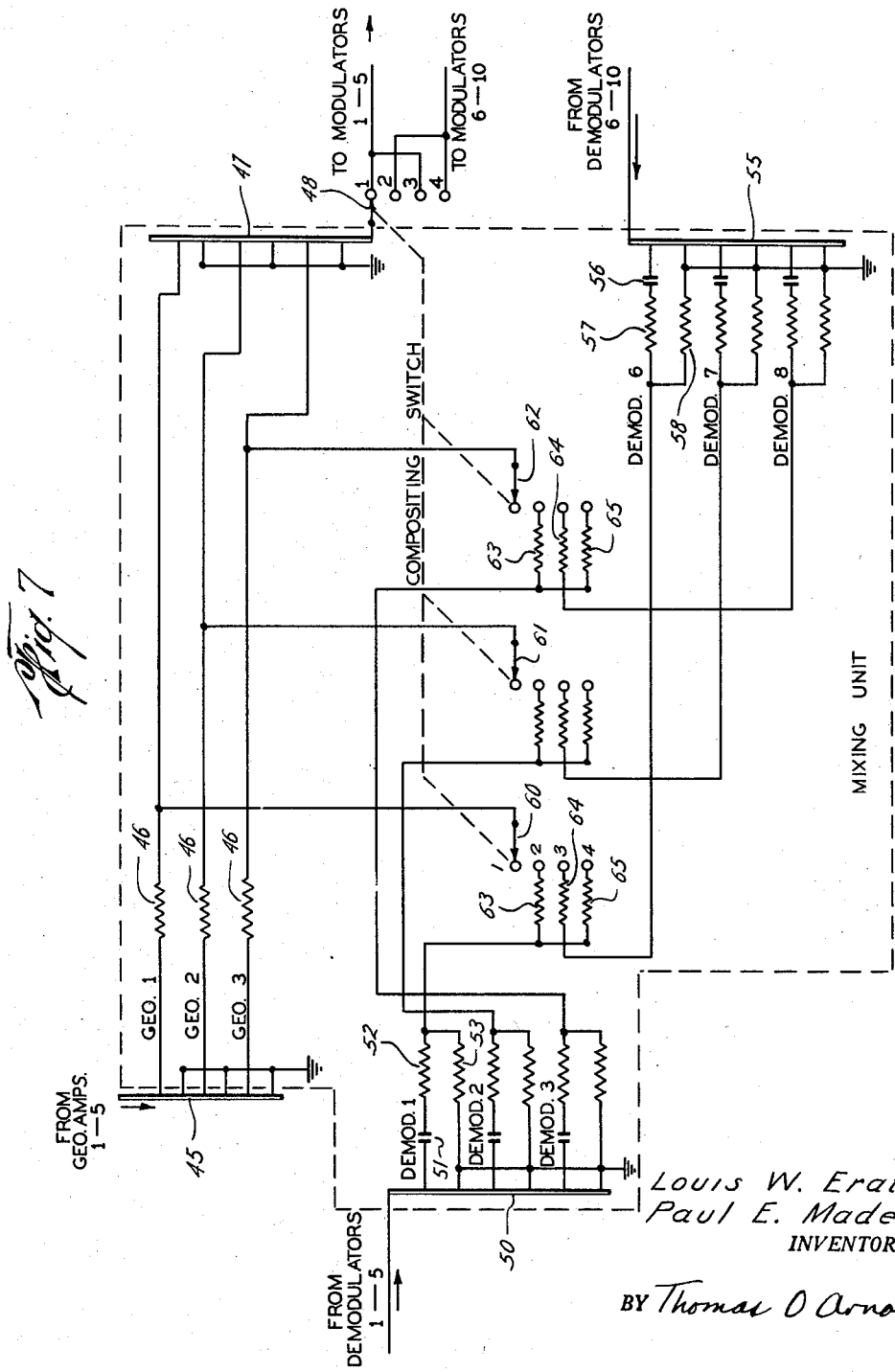

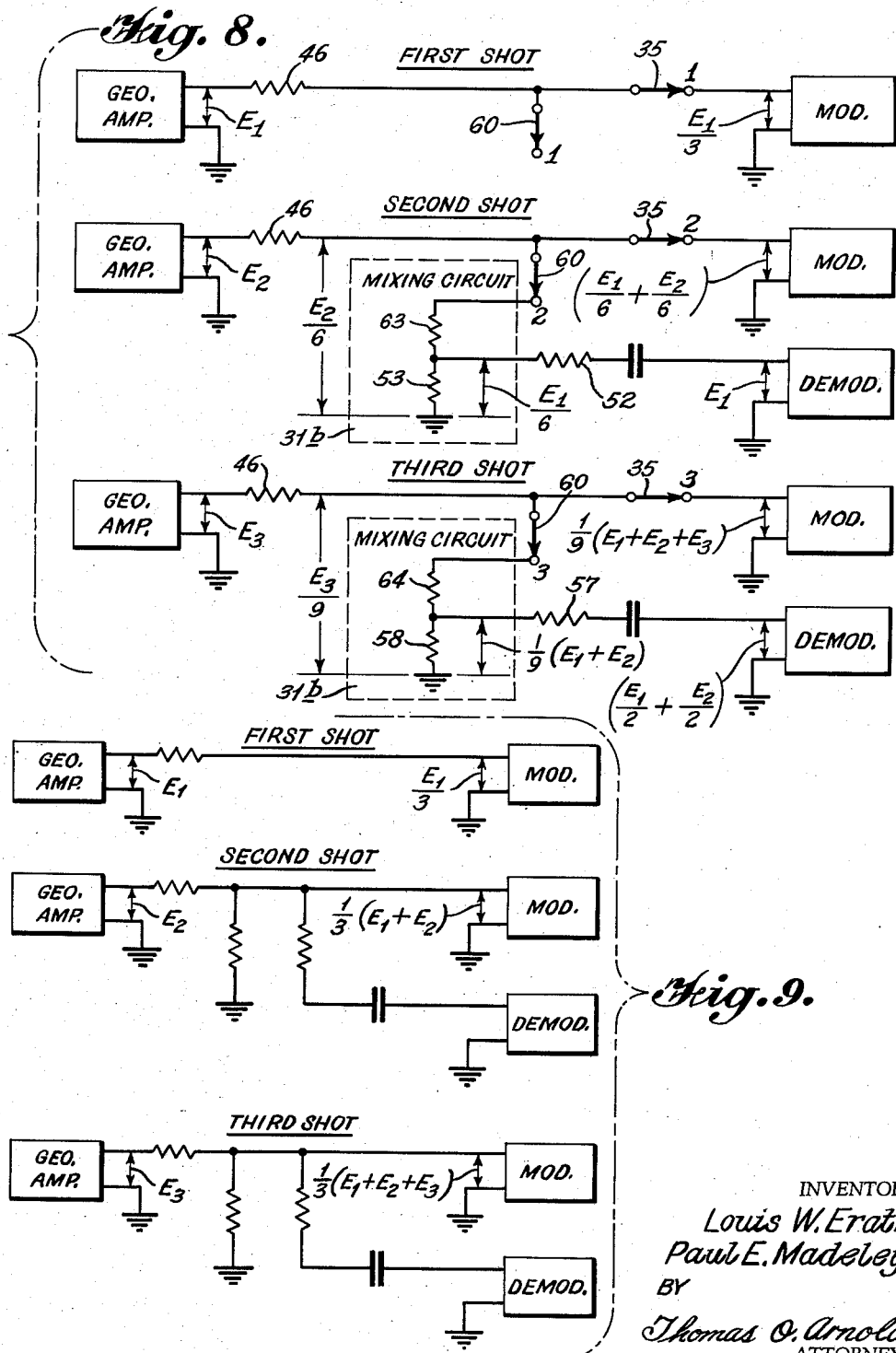

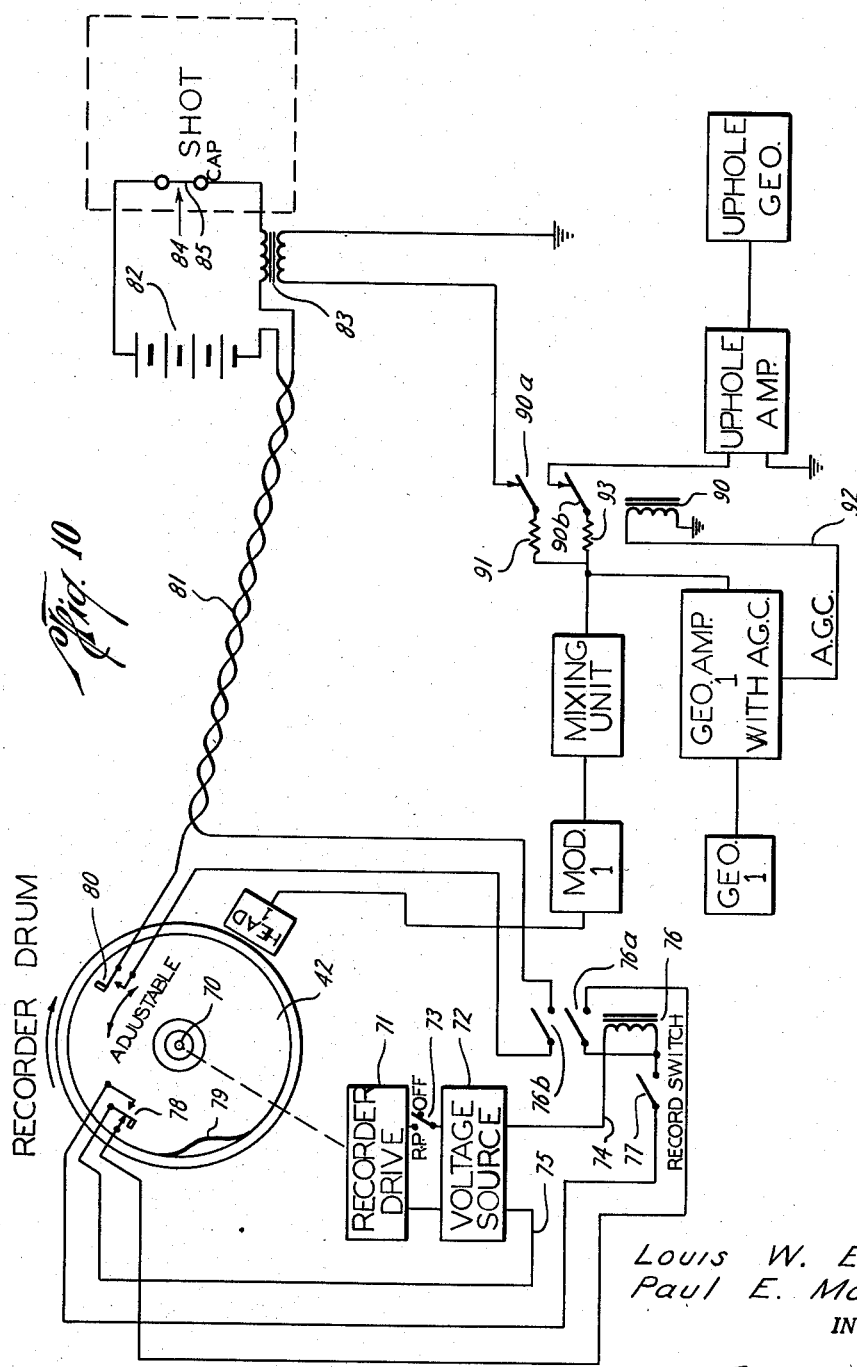

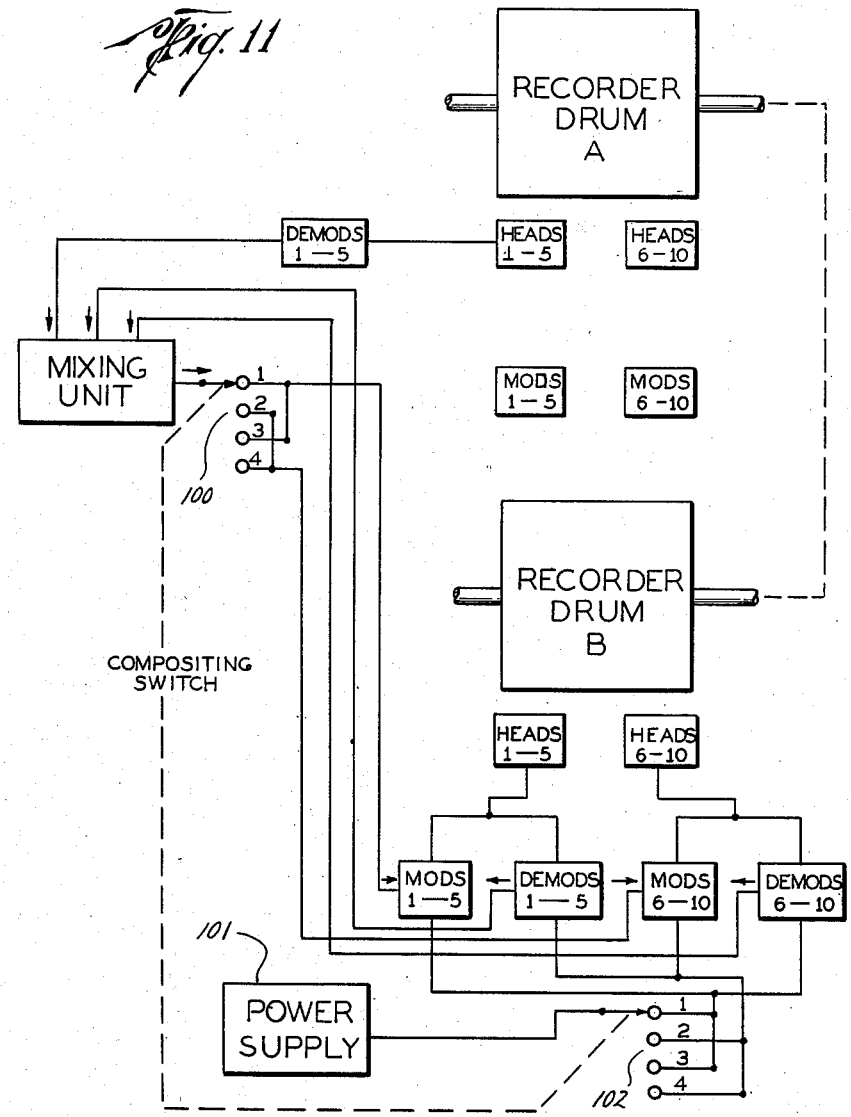

United States Patent Office 2,902,107
Patented Sept. 1, 1959

2,902,107

METHOD AND APPARATUS FOR COMPOSITING SEISMIC EXPLORATION RESULTS

Louis W. Erath and Paul E. Madeley, Harris County, Tex., assignors to Dresser Industries, Incorporated, Dallas, Tex., a corporation of Delaware Application April 13, 1956, Serial No. 578,118

7 Claims. (Cl. 181—.5)

This invention relates to seismic exploration, and, more particularly to methods and apparatus for compositing seismic exploration results.

Perhaps the most-used method in location of possible oil and gas-producing structures is seismic testing. This method involves generating vibration waves in the earth by detonating a shot or dropping a weight and translating the resulting vibration waves with one or more strings of geophones or seisometers positioned near the source of the vibrations into electrical voltages. These voltages are recorded, usually on photographic webs or tapes, and analyzed by geophysicists. The significant data on the records represent reflections from boundaries between structures of different density. Knowing the velocity of vibration waves in the various materials through which the waves travel and the speed of the movement of the record on which the geophone outputs are placed, the depths of the various boundaries can be determined.

This method yields results which are quite difficult to evaluate, especially because of so-called noise signals which are present along with the signals representing true reflections. While filters may be used to screen out some of the noise signals, filtering reduces the total information recorded and also is not effective against noise signals in the band width of the information desired. One method of reducing the influence of noise signals that has been proposed is that of compositing records obtained from generating a plurality of vibration waves at different locations in the earth and recording the waves with geophones in one position. This method was expected to reduce the effect of noise signals, since such signals would be expected to be out of phase at the geophone so as to add only their R.M.S. values, while the reflection signals would be in phase and add directly. However, the methods of compositing previously suggested have been difficult to perform and have not yielded the results expected. One such previously-suggested method involved adding the electrical signals obtained from sequentially generating a plurality of vibration waves, by superimposing the signals on magnetic tape. While ingenious, we have found that this method could not be expected to yield very good results because of the nonlinear characteristics of magnetic material.

We have avoided the difficulty with the method of compositing referred to by adding the electrical signals from different locations of generation together in a mixing circuit and recording the sum or composite of the signals. Since a mixing circuit can be made to be perfectly linear, we obtain true addition of the signals, so as to emphasize reflections and de-emphasize noise. There are also further features of our method and apparatus which are novel and contribute to the improved results we can obtain, as well as to simplicity of apparatus and ease of operation.

Our method, generally speaking, includes the steps of generating vibration waves sequentially at a plurality of locations in the earth, detecting said waves at one position, translating the detected waves into electrical signals, combining the electrical signals from the different generated waves into a composite electrical signal, and recording the composite signal. The vibration waves may be generated by detonating explosive shots in boreholes in the earth or dropping a heavy weight onto the earth. The recording step is preferably performed with a magnetic recorder, and the most advantageous feature of our method is recording composite signals on the same recorder as used for playback of the signals to be composited, by switching recording and reproducing functions back and forth between two or more heads, or sets of heads, on the recorder.

The apparatus of the invention includes a magnetic recorder and mixing and switching means operable to add the signals together and switch recording and reproducing functions of the heads back and forth, as above outlined. The apparatus further includes means for adjusting the generation time to compensate for different time intervals for passage of seismic waves between the different locations of generation and the position of the wave detector or seisometer. Also, the generation may be automatically initiated by operation of the recorder.

The apparatus of the invention further includes means for recording an uphole geophone output and the time break along with the other geophone outputs, to facilitate examination and interpretation of the results of the exploration.

The method and apparatus of the invention will now be more fully described in conjunction with preferred embodiments thereof, as shown in the accompanying drawings.

In the drawings:

Fig. 5 is a block diagram of the main elements of the apparatus of the invention;

Fig. 6 is a view similar to Fig. 5 but showing the elements more particularly;

Fig. 7 is a schematic diagram of the mixing unit of Fig. 6;

Fig. 8 is a schematic representation of one method of combining the electrical signals from the various shots;

Fig. 9 is a view similar to Fig. 8 showing another method of combining the signals;

Fig. 10 is a schematic and block showing of the shot time-adjustment, and uphole and time break recording features of the apparatus;

Fig. 11 is a view similar to Fig. 6 showing an apparatus including two recorder drums and capable of operation to retain recordings for each shot permanently.

Figure 1:
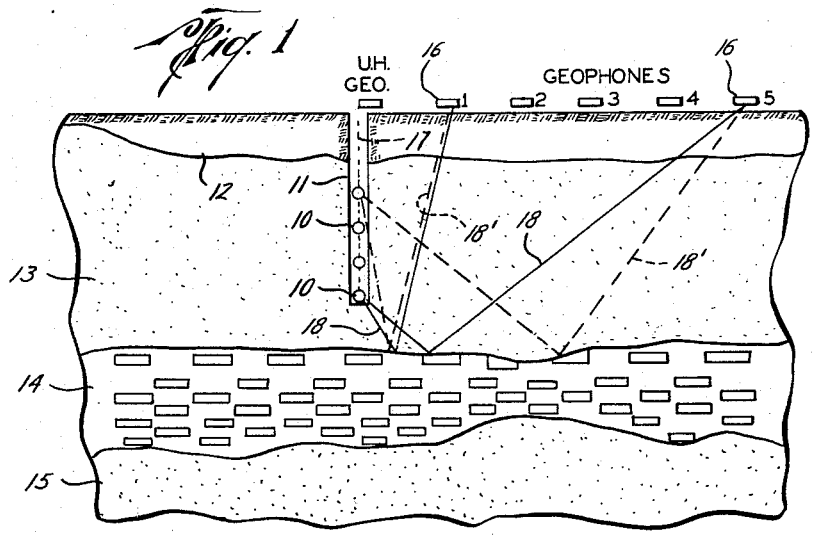
Fig. 1 is a schematic representation of a portion of one of the methods of the invention, using a single borehole with shots vertically spaced therein.

Referring to Fig. 1, the method of the invention includes generating seismic waves in the earth, as by detonating a plurality of explosive charges 10 in a borehole 11 extending downwardly from the surface of the earth. The borehole penetrates a weathering layer 12 and a layer of sand 13, while a layer of stone 14, and a second layer of sand 15 extend below the borehole. As will be understood, the showing is highly simplified and schematic in nature.

A string of geophones 16 is strung out at one side of the borehole in position to detect seismic waves generated by detonation of the explosive charges. While five geophones are shown in an end-on arrangement, it will be understood that more or less geophones could be used and in other arrangements than the one shown. It will further be understood that the shots may be of any appropriate nature and size.

The lowermost shot, when detonated, generates vibration waves which reach the geophones from any directions and after reflection from many different places, but the first energy to reach the geophone nearest the borehole, called the uphole geophone, follows the more or less direct path identified with the dashed line 17, and, when recorded, shows as a sharp break in the record identified in Figs. 3 and 4 as the "uphole." Later, energy reflected from the boundary between layers 13 and 14 reaches the geophones over paths identified with solid lines 18. The vibration waves so reaching the geophones are translated thereby into electrical voltage signals, one for each geophone, which are appropriately recorded.

The remainder of shots 10 are then fired sequentially. As will be noted in Fig. 1, they are of different depths in the borehole. When the uppermost shot is detonated, the wave reflected from the boundary between layers 13 and 14 travels along paths 18' to reach the geophones. The vibration waves reaching the geophones from the remaining shots are also translated thereby and recorded. The various records thereby obtained are composited in a manner to be explained.

Figure 2:
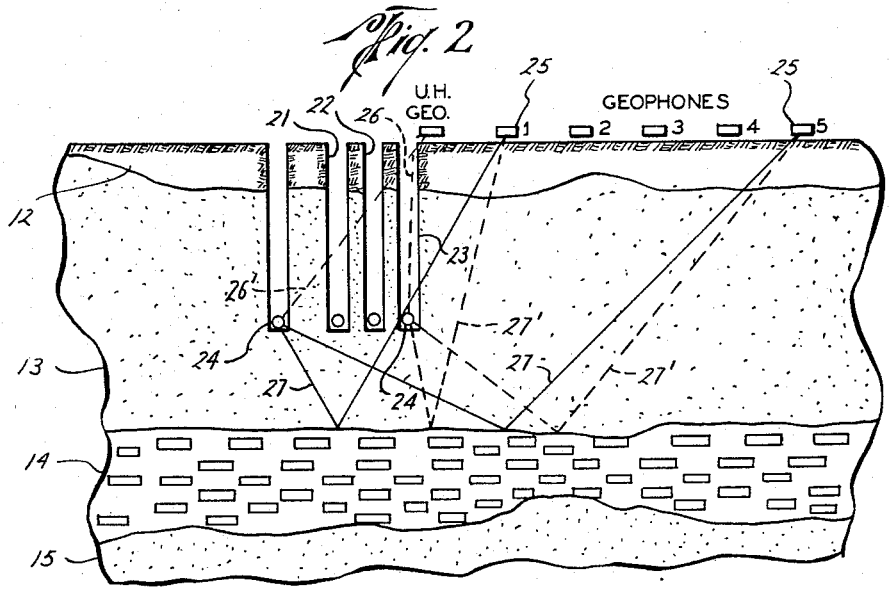
Fig. 2 is a view similar to Fig. 1 showing the use of a plurality of spaced boreholes, each containing a shot.

It is not necessary that the several shots be disposed in a single borehole, for they could be fired in different boreholes, as shown in Fig. 2 and at the same, or different, depths. In Fig. 2 the same earth structure is shown and consequently is identified with the same numerals as employed in Fig. 1. A plurality of bore holes 20 through 23 extend down into the earth structure of Fig. 2 and one shot 24 is disposed in each borehole. Geophones 25 are laid out along the surface of the earth, as before, though for either arrangement of shots they may be buried in the ground or otherwise shielded to diminish the effect of wind noise.

The first energy from the shot 24 nearest the geophones to reach the uphole geophone travels along dashed line 26, while the first energy from the farthest shot reaches the same geophone along similar, though longer, line 26'. The reflected wave from the boundary between layers 13 and 14 reaches the geophones along solid lines 27, for the first or farthest shot, and along dashed lines 27' for the nearest shot. The geophones translate the waves into electrical signals which are recorded in appropriate manner.

It will be noted that the various waves from different shots to the same geophone travel different paths when using either method of shooting, though they are all reflected from the same boundary. Consequently the noise signals at the same geophone for different shots would not be expected to coincide, though the reflected signals, when compensation for difference in time of passage between shot point and geophone is made, would be in phase. This condition is illustrated in Fig. 4, which is a highly idealized showing of visual records obtained from three geophones for each of four shots positioned as shown in either of Figs. 1 and 2.

Figure 3:
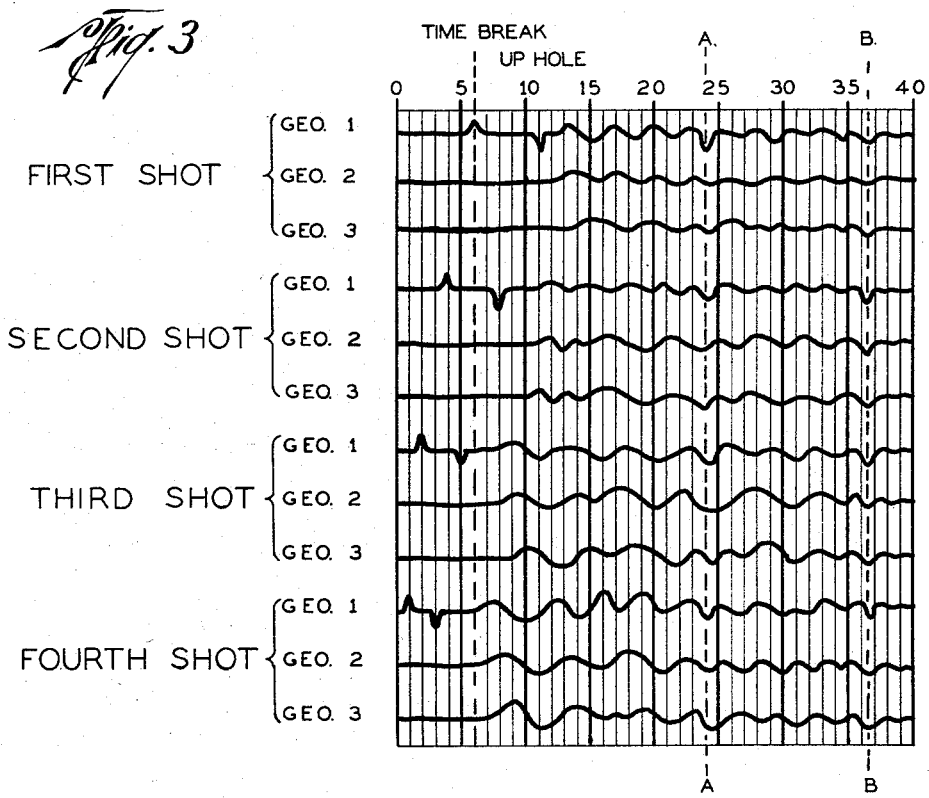
Fig. 3 is an idealized showing of visual recordings which might be obtained with the methods of Figs. 1 and 2.

Referring first to Fig. 3, this figure represents highly idealized showings of the recorded outputs of the first three geophones for each of four shots, progressing upwardly from the lowermost shot in the method of Fig. 1, or progressing to the right from the farthest shot from the geophones in the method of Fig. 2. The first indicator on any of the traces is the "time break" shown on the traces of the first geophone for all of the shots. The time break corresponds to the instant of firing or detonating the shot and may be placed on any of the traces, as by the apparatus of Fig. 10. Normally the time breaks for the several shots would line up in a vertical line but, since there are varying distances between the shot locations and the positions of the geophones, we compensate for the changed time of travel of the waves for the different shots by moving the recordings to the left for shots progressively closer to the geophones, as by the shot time adjusting apparatus of Fig. 10.

The second indication on the several traces is the "uphole," representing the first energy reaching the geophone next adjacent to the borehole. Since, particularly in the method of Fig. 1, this signal represents the vertical distance between the shot and the geophones, the time is represented on the traces between the time break and the uphole is very useful, particularly for determination of the depth of a reflecting boundary. In order that reflections may line up vertically on records of the several shots, we adjust the time of shooting in such fashion that the reflection signals are vertically aligned.

Time is indicated on the records by vertical lines, heavier lines being used to indicate every fifth division. The interval between lines may appropriately be one-hundredth of a second. For zero time at the beginnings of the traces, the uphole is shown at 11, 8, 5, and 3 hundredths of a second, with the time break occurring at 6, 4, 2, and 1 hundredths of a second for shots 1-4, respectively. While four shots are shown, it is obvious that as many shots as desired could be used, while as many geophones as preferred could be employed.

Examining now the traces to the right of the uphole, the energy reaching the geophones is seen to change continuously with time. In the idealized showing of Fig. 3, the waves follow a sine-like waveform, though of changing frequency. Comparison of the waves for the three geophones and the several shots yields a quick conclusion that a great deal of noise is present in the geophones, but it is also seen that all of the waves dip below the average at points A and B, thus indicating reflections at boundaries which are at distances below the geophones determined by the time interval between the time break and these points. Only one set of reflections has been shown in each one of Figs. 1 and 2 for simplicity, but it will be obvious that other reflections will be obtained in conventional structure. The reflections at A in Fig. 3 may correspond to those from the boundary between layers 13 and 14, while the reflections at B may correspond to a deeper boundary. Though these reflections show up on the traces of Fig. 3, they are quite hard to locate, and location of reflections on actual traces is much more difficult. The compositing to be described hereinafter has been developed to diminish the effect of noise signals and increase the amplitude of reflection signals, so as to make it easier to locate them.

Figure 4:
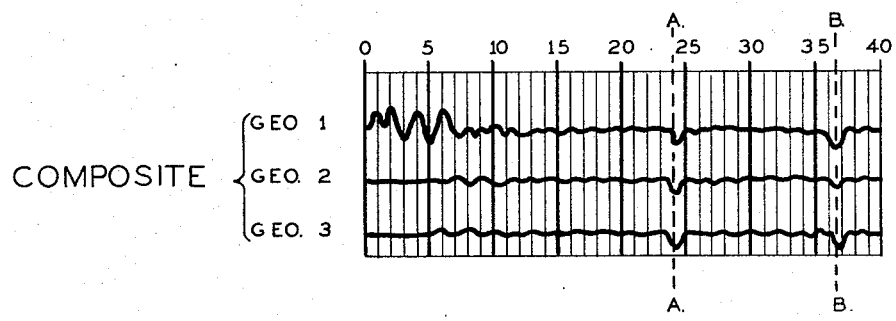
Fig. 4 is a view of the results which might be obtained from compositing the results of Fig. 3, in accordance with the invention.

Fig. 4 is an illustration of composite traces that might be obtained by addition of the signals represented by the traces of Fig. 3. In that figure, all of the signals from the first geophone, all of the signals from the second geophone, and all of the signals from the third geophone have been added together to form composite traces for each of the three geophones. The noise voltages, being out of phase with each other, add only their R.M.S values and partially cancel, while the reflected voltages add directly. As is obvious from an examination of Fig. 4, the reflections are much more evident after compositing than before.

While it has been stated that the traces of Figs. 3 and 4 are highly idealized, it should also be mentioned that it has been assumed the signals have been corrected to compensate for varying time of arrival at the various geophones caused by differing distances of the geophones from the shot point. If not so corrected the reflection voltages would not line up vertically on the trace but would rather line up on slants of increasing slope with increasing time.

The method and apparatus of the invention used to obtain signals of the type shown in Fig. 4 will now be described. Referring to Fig. 5, the weak electrical voltage signals supplied by the geophones 16 in response to vibration waves detected thereby are amplified in geophone amplifiers 30 to increase the amplitudes to levels more suitable for recording. The signal from each amplifier is fed individually through a switching and mixing unit 31 where it may be combined with voltage signals from the same amplifier obtained from several shots. The outputs of the switching and mixing unit could be recorded directly in a multi-channel magnetic recorder 32 through recording and reproducing heads 33, but it is preferred to diminish the effect of noise in the recording system by frequency modulating carrier waves with the amplifier signals. This modulation function, as well as the demodulation function used in the compositing method, is performed in the modulators and demodulators 34.

Referring next to Fig. 6, the major portion of the apparatus, together with the switching portion of the mixing and switching unit, is shown there in more detail, but showing the five geophone amplifiers and the connections for transmitting the voltage signals therefrom by single blocks and lines.

Geophone amplifiers 1–5 are shown connected to the mixing unit 31a to supply their voltage signals to one input thereof. The output of the mixing unit is supplied to one section 35 of a compositing switch having a plurality of movable contacts movable to connect the output to stationary contacts of number corresponding to the number of shots detonated. The first and third stationary contacts of this section of the switch are connected together to the input of modulators 1–5 for geophones 1–5. The second and fourth contacts are connected together to the input of modulators 6–10, and modulators 1–5 and 6–10 have their outputs respectively connected to recording and reproducing heads 1–5 and 6–10.

Also respectively connected to heads 1–5 and 6–10 are the inputs of demodulators 1–5 and 6–10. The outputs of demodulators 1–5 and 6–10 are both connected to inputs of mixing unit 31a. Though the mixing unit 31a is shown as having three inputs, the actual mixing circuit has only two inputs, as will be explained in conjunction with Fig. 7, since another section of the compositing switch selects the output of only one of the demodulators 1–5 and 6–10 for mixing in any one position of the switch.

It will be obvious that only one of the demodulators and modulators will be effective with each set of heads 1–5 and 6–10 at any one time. To accomplish this the voltage supply for operation of the modulators and demodulators is obtained from a power supply 40 through a second section 41 of the compositing switch, also having a contact movable to touch different numbered stationary contacts. Stationary contacts 1 and 3 of switch section 41 are connected together and connected in multiple to modulators 1–5 and demodulators 6–10, while contacts 2 and 4 are connected together and connected in multiple to demodulators 1–5 and modulators 6–10. The result is that only modulators 1–5 feeding heads 1–5 and demodulators 6–10 fed from heads 6–10 are effective for the first and third shot positions of the compositing switch, while demodulators 1–5 fed from heads 1–5 and modulators 6–10 feeding heads 6–10 are effective when the switch is in its second and fourth shot positions.

Heads 1–5 and 6–10 are positioned adjacent a rotatable recorder drum 42 driven at a known speed and which may carry a multi-channel magnetic tape (not shown). The tape may have space for one channel for each of the geophones employed and may have additional channels cooperable with additional heads for timing signals and the like.

The apparatus of Fig. 6 may be operated for compositing as now to be described. The compositing switch is placed on its first position and shot number 1 fired or detonated. The voltage signals from geophone amplifiers 1–5 are supplied to the mixing unit and through one section of the compositing switch to modulators 1–5. The frequency modulated carriers of the modulators are recorded on channels 1–5 of the magnetic tape through heads 1–5. Demodulators 1–5 are not effective at this time, nor are modulators 6–10 and, as will be explained in conjunction with Fig. 7, demodulators 6–10 are not connected to the mixing circuit in the first shot position of the compositing switch, so that the voltage signals from geophones 1–5 are alone recorded on channels 1–5 of the tape. Next, the compositing switch is moved to shot position 2 and the second shot fired. The voltage signal outputs of geophones 1–5 are supplied by geophone amplifiers 1–5 to one input of the mixing unit and, since demodulators 1–5 are energized at the time, the signals from the first shot are played back or reproduced and mixed with the signals from the second shot in the mixing circuit. Modulators 6–10 are also energized, so the composite signal representative of a mixture of signals from the first and second shots is recorded through heads 6–10 on channels 6–10 of the tape.

Next, the compositing switch is moved to its third shot position and the third shot is fired. Geophone signals from geophones 1–5 are fed to one input of the mixing circuit and combined there with the played back signals from channels 6–10, since demodulators 6–10 are representing a mixture of geophone signals, one for each energized at this time. The second composite signal geophone, from all three shots, is fed from the output of the mixing circuit to modulators 1–5. Since frequency modulated signals supplied to recording heads have the property of erasing information previously recorded on channels opposite those heads, the geophone signals from the first shot are erased and the second composite signal is recorded on channels 1–5 of the tape.

Finally, for four shots, the compositing switch is moved to its last position and the last shot fired. This time the geophone signals from the fourth shot are combined with the second composite signals reproduced by heads 1–5 and the resultant third composite signals are recorded by heads 6–10.

If more shots are desired the last-mentioned reproducing, combining and recording steps may be repeated for each additional shot, or n−3 times for n total shots.

The record channels 6–10 of the tape is a composite of all the signals supplied from the several shots. It may be reproduced, demodulated and fed, for instance, to an appropriate oscillographic recorder to produce a composite record of the type shown in Fig. 4.

The mixing unit 31a of Fig. 6 is shown in detail in Fig. 7. In that figure the cable 45 carrying leads for channels 1–5 from the geophone amplifiers is shown in the upper left corner. Three channels only from the cable are shown, for simplicity. Each channel has two leads and one lead of each channel is grounded. The other leads of the channels are each connected through a resistor 46 to similar leads of cable 47 which carries signals to modulators 1–5 or 6–10 through compositing switch section 35.

Demodulators 1–5 are connected to the mixing unit through a cable 50 carrying leads for five demodulators. One lead from each demodulator is connected to the series combination of a capacitor 51 and a resistor 52 with the end of the resistor remote from the capacitor being connected to ground through a resistor 53.

Demodulators 6–10 are correspondingly connected to the mixing unit through a cable 55. One lead of each demodulator channel is grounded and the other lead is connected to the series combination of a capacitor 56 and resistor 57. The side of resistor 57 remote from the capacitor is connected to ground through a resistor 58.

The compositing switch has three additional sections 60–62 in the mixing unit. Each of the movable contacts of the switch sections is connectable to four stationary contacts with the first stationary contact unconnected, and the movable contacts of sections 60–62 are connected to the ungrounded sides of channels 1–3, respectively, to the geophone amplifiers through resistors 46.

The second, third and fourth stationary contacts of the three compositing switch sections are connected respectively to similar resistors 63, 64 and 65. The ends of resistors 63 and 65 remote from the contacts are connected together to the junctions of resistors 52 and 53 of the appropriate channels of demodulators 1–5, with the connections from the switch sections 60–62 connected to channels 1–3, respectively. The ends of resistors 64 corresponding to the switch sections 60–62 are connected to the junctions between resistors 57 and 58 of demodulator channels 6–8, respectively.

The various resistors described function as a mixing circuit for attenuating the voltages supplied the circuit to appropriate values and for combining, actually adding, voltages together, in all but the first shot position of the compositing switch. It is evident that every channel has its own mixing circuit, that is, the outputs from the separate geophones all remain separate, no matter how many shots are fired or signals composited. It will also be obvious that the mixing circuits could be adapted for any number of shots, merely by adding switch contacts and resistors in duplication of those shown, and any number of geophones could be used, there being one additional compositing switch section for each additional geophone.

The mixing circuit of Fig. 7 is shown in simplified fashion for one channel and each shot in Fig. 8. The resistors of Fig. 8 are so selected, in accordance with the input impedance of the modulator and the output impedances of the geophone amplifier and the demodulator, as to maintain the percentage of modulation effected by the voltage supplied the modulator constant, no matter how many voltages are composited. The example shown is for 33⅓ percent modulation of the carrier and assumes that the full geophone output would, by itself, modulate the carrier 100 percent. In recording the first shot, only resistor 46 is operative, since the first contact of switch section 60 is unconnected, and that resistor drops the amplifier output $E_1$ to ⅓ $E_1$ at the modulator input. In recording the second shot, the geophone amplifier output $E_2$ is developed across the series combination of resistors 46, 63, and 53, while the demodulator output $E_1$ (assuming a gain of three in the demodulator) is developed across resistors 52 and 53, and the modulator input is taken from across resistors 63 and 53 in series, which form mixing circuit 31b. As shown in Fig. 8 the geophone amplifier itself supplies a voltage.

$$\frac{E_2}{6}$$

across resistors 63 and 53, so that the total voltage supplied to the modulator when the demodulator output is zero is $$\frac{E_2}{6}$$

Also, the demodulator itself supplies a voltage $$\frac{E_1}{6}$$

across resistor 53, so that the total voltage supplied to the modulator when the geophone amplifier output is zero is $$\frac{E_1}{6}$$

Consequently, the modulator input voltage is the sum of the geophone amplifier-supplied voltage and the demodulator-supplied voltage, or $$\left(\frac{E_1}{6} \text{ plus } \frac{E_2}{6}\right)$$

which will modulate to the same percentage as ⅓ $E_1$. (The geophone amplifiers preferably have automatic gain control and their average outputs are the same.)

For the third shot, resistor 63 is replaced by resistor 64 in the circuit and resistor 53 by resistor 58, and the modulator is driven by ⅑ ($E_1$ plus $E_2$ plus $E_3$). Again the percentage of modulation is the same. This percentage can be kept constant through as many compositing operations as desired, with proper selection of resistance values.

It will be seen that the mixing circuit of Fig. 8 is formed of a plurality of pairs of series-connected resistors, one pair being the combination of resistors 53 and 63 and another pair being the combination of resistors 58 and 64. If more than three shots are composited, as is indicated, for instance in Fig. 7, there would be more pairs of resistors. However, the resistors 53 and 58, across which are developed the signals from the respective heads on playback, would be common to the other pairs of resistors. This is indicated by Fig. 7, wherein resistor 65 is shown as connected in series with resistor 53 to form a third pair of resistors. Considering the resistor 53 as a "first" resistor and the resistor 58 as a "second" resistor, the resistor 63 forms with the "first" resistor (53) one pair of series-connected resistors when the switch 60 is in the 2 position. Similarly, the "first" resistor (53) forms with the resistor 65 another pair of series-connected resistors when switch 60 is in the 4 position. Further, resistor 64 forms with the "second" resistor (58) a further pair of series-connected resistors when switch 60 is in the 3 position. Also, resistors 63 and 65 form one set of resistors, while resistor 64 (and others, if more than four shot records are to be composited), forms a second set. Through the connections shown, mixing may be accomplished in a pair of series-connected resistors for each shot position of the compositing switch with a constant percentage of modulation.

In some cases it may be desired to replace the constant percentage of modulation method of compositing with an increasing percentage of modulation method. Fig. 9 shows, in the same manner as Fig. 8, circuits that will accomplish that end. In Fig. 9 assuming only three shots are fired, that it is desired to have the voltages from different shots of equal weight in the final composite voltage, with the total modulating 100 percent, and that the output of the geophone amplifier would modulate 100%, each voltage from the geophone amplifier is divided by three before being supplied to the modulator. The circuit is the same as that of Fig. 8, except that the resistor corresponding to resistors 63 and 64 of that figure is eliminated. The final output of the modulator is ⅓ ($E_1+E_2+E_3$), which modulates 100%.

The apparatus of Fig. 10 is designed to accomplish several of the functions referred to in conjunction with Fig. 3, including adjusting the shot time, or time break, on the records, to compensate for the differing time intervals of passage of signals from the various shot locations and the geophone positions, and placing the up-hole and first break signals on the signals to be recorded.

The recorder drum 42 is rotated by a shaft 70 driven by an appropriate recorder drive 71. The recorder drive is energized to rotate the recorder drum from an appropriate voltage source 72, under control by a two position switch 73. Switch 73 is shown in its off position, but, when positioned in its record-playback position, it permits energizing voltage to reach the recorder drive and start rotation of drum 42.

Voltage source 72 has a second output supplied through leads 74 and 75. Lead 74 is connected to one side of a relay coil 76 which, when energized, closes contacts 76a and 76b. The other side of relay coil 76 is connected through a record switch 77 to the normally-open stationary contact of a single pole, double-throw switch 78. The movable contact of the switch is connected to voltage source lead 75, while the normally-closed stationary contact of the switch is connected to one of the contacts 76a, the other contact being connected to the lower side of relay coil 76. Thus, when switch 73 is moved to its record-playback position, record switch 77 is moved to its operative position, and the movable contact of switch 78 is moved to contact its normally-open contact, the recorder drum is rotated and the relay energizes to close contacts 76a and 76b, thereby preparing a holding circuit for the relay operative when switch 78 is moved back to its normal position.

Switch 78 is preferably mounted in fixed position in the path of travel of a cam surface 79 mounted on the inner rim of recorder drum 42. When the drum rotates from the position shown, the cam surface forces the switch 78 into contact with its normally-open contact, and when the cam surface has passed by the switch, the switch returns to its normal position.

A second switch 80 is also mounted in the path of movement of cam surface 79, but this switch is preferably adjustable in opposite directions arcuately in a path concentric with the periphery of the drum. Switch 80 has a pair of contacts which are normally open, one of which is connected to contacts 76b of the relay, while the other contact is connected to one lead of a two-conductor cable 81. Cable 81 is connected to the blaster for the shot. One lead of cable 81 is connected to one side of a battery 82, while the other lead is connected through the primary of a transformer 83 to one side of the blasting cap 84. The other side of the cap is connected to the other side of battery 82. Cap 84 may be of conventional design, including a low resistance wire 85 which heats when current is supplied it from battery 82 to detonate the explosive (not shown) in the shot. When the wire 85 reaches a certain temperature just before detonation it breaks, thus breaking the circuit through the primary of transformer 83 and generating a decaying pulse of voltage therein.

The shot time adjustment feature of the invention is accomplished through adjustment of the arcuate position of switch 80 with respect to the recording-reproducing heads. Thus, as shots progressively higher in a borehole are detonated successively, the switch may be moved more and more counterclockwise in accordance with a known relationship between the arcuate spacing of the head and switch for a given speed and the travel time of waves from the shots to the geophones. This adjustment may be made in accordance with an educated guess as to the wave velocity in the structure surrounding the borehole, or a velocity log of the borehole may be made before the shots are fired and the switch moved in accordance with the wave travel time difference predicted from this log.

It will be understood that each shot has a cable 81 connected to it, and the battery and transformer may be located in the shot or at the surface of the earth. The cables could be connected to a single switch 80, or separate switches 80 for each shot could be used. It will also be understood that the cam surface 79 on the drum could be adjustable, rather than the switch, and the cam surface could be stationary and the switch rotatable with the drum.

As indicated above, a pulse of voltage is developed across the primary of transformer 83 when the wire 85 breaks, and this pulse is also developed across the transformer secondary. One side of the secondary is grounded, and the other side is connected through normally closed contacts 90a of a relay 90 and a resistor 91 to the input of the mixing unit. The first geophone amplifier is also connected to the same input of the mixing unit, so a pulse of voltage indicating the time break is supplied to the first recording head along with the first geophone signals.

Also as indicated above, the geophone amplifiers preferably have automatic gain control to maintain their outputs relatively constant. This feature develops an A.G.C. voltage in the amplifier which reaches a predetermined high level when the high amplitude first energy from the seismic wave reaches the first geophone, and which drops off with increasing time as the energy levels reaching the geophone decrease. This A.G.C. voltage is supplied to the coil of relay 90 over a circuit including lead 92. The high level voltage caused by the first energy reaching the first geophone energizes the relay and keeps it energized, until the A.G.C. voltage decays below a predetermined much lower level.

The uphole signal from the uphole amplifier is also connected to the same input of the mixing unit through normally-closed contacts 90b of relay 90 and resistor 93. Thus, as long as the relay is not energized, the uphole and first break signals are supplied to channel 1 of the recorder and recorded along with the voltage signal from the first geophone. When substantial seismic energy reaches the first geophone, relay 90 picks up to disconnect the blaster circuit and the uphole geophone amplifier from the first channel. However, the pulses we have termed the "first break" and the "uphole" have already reached the recorder by this time and appear sequentially near the beginning of a record of the first geophone signal. In Figs. 3 and 4 the first break and uphole are shown as positive and negative pulses, respectively, and the circuit of Fig. 10 may incorporate rectifiers (not shown) poled to accomplish this polarity.

With the apparatus shown in Fig. 10, the time break and uphole signals are composited with the signal from the first geophone amplifier. However, it will be obvious that the same signals could be added to any or all of the geophone signals and they could be supplied to a separate head in such fashion that only the time break and uphole signals from the uphole geophone reach this head.

It will be obvious from a consideration of the method disclosed in conjunction with Fig. 6 that the records from individual shots are destroyed during the process of compositing. In some cases it may be desired that these records be retained, so they can be examined individually later or translated into record traces of the type shown in Fig. 3. The apparatus of Fig. 11 is designed to allow compositing without destruction of the records for individual traces. The apparatus includes two recorder drums, labelled A and B, each having at least ten record channels, for the example shown, on the magnetic tapes carried thereby. Each of the drums has heads 1–5 and 6–10. The records from individual shots may be recorded on separate tapes on drum A, the tape being replaced with a new one after each shot, through conventional circuitry (not shown) connecting modulators 1–5 and 6–10 to heads 1–5 and 6–10, and connecting the outputs of the usual geophone amplifiers 1–5 and 6–10 (not shown) to the corresponding modulators.

Only the apparatus used during the compositing operation is shown connected in Fig. 11, since the apparatus for simple recording and playback of the individual shot signals may be of conventional design.

The mixing unit of Fig. 11 has three inputs, one being supplied directly from demodulators 1–5 of drum A, a second being supplied from demodulators 1–5 of drum B and the third being supplied from demodulators 6–10 of drum B. As will be explained, only one of demodulators 1–5 and 6–10 is effective at any one instant, so that the actual mixing circuit has only two inputs.

The output of the mixing unit is supplied to section 100 of the compositing switch, which selects which of modulators 1–5 and 6–10 of drum B is used. Contacts 1 and 3 of the switch, corresponding to shots 1 and 3, are connected together to modulators 1–5, while contacts 2 and 4, corresponding to shots 2 and 4, are connected together to modulators 6–10.

The modulators and demodulators associated with drum B obtain their operating voltages from power supply 101 through another section 102 of the compositing switch. Contacts 1 and 3 of the switch section 102, corresponding to shots 1 and 3, are connected together and connected in multiple to modulators 1–5 and demodulators 6–10. Contacts 2 and 4, corresponding to shots 2 and 4, are connected together and connected in multiple demodulators 1–5 and modulators 6.10. The result is that for the first and third shot positions of the switch, modulators 1–5 and demodulators 6–10 are energized, and for the second and fourth shot positions, demodulators 1–5 and modulators 6–10 are energized.

The mixing unit of Fig. 11 may be similar in design to that of Fig. 7, so that its specifics will not be detailed.

In this method preferably employed in conjunction with the apparatus of Fig. 11 to preserve records of the individual shots, separate records for each shot are made, for instance on recorder drum A. The record of the first shot is then placed on drum A and the compositing switch placed in the first shot position. Signals from channels 1–5 are reproduced in heads 1–5 of drum A and supplied by the associated demodulators to one input of the mixing unit. These signals are furnished from the output of the mixing unit to modulators 1–5 of drum B to drive heads 1–5 and record the first shot geophone signals on channels 1–5 of the tape. Next, the tape on drum A is replaced with a tape of the second shot signals and the compositing switch moved to shot position 2. The second shot signals are reproduced from drum A and fed to one input of the mixing unit, along with the first shot signals reproduced with heads 1–5 of drum B. The mixing unit adds the signals together to produce composite signals which are supplied from the output of the mixing unit to heads 6–10 of drum B and recorded on channels 6–10 of the record thereon. The record of the third shot signals is then placed on drum A and supplied therefrom to one input of the mixing unit where, with the compositing switch in shot position 3, it is added to the composite signals from heads 6–10 of drum B, and the composite signal output drives heads 1–5 of drum B. The reproducing, combining and recording steps are repeated as many times as the number of additional shots fired.

The apparatus of Fig. 11 is preferably provided with the shot time adjustment feature of Fig. 10, and the switch controlling the position of the uphole on the composite records changed for each combining step so as to compensate for different travel times of the waves from the different shots to the geophones.

The voltage signals obtained with the apparatus of Fig. 11 may be composited in the manner described in conjunction with Fig. 8, or in conjunction with Fig. 9. That is, the constant percentage or the increasing percentage of modulation method may be used.

The apparatus of Fig. 11, when used as described above, preserves the records of individual shots, but it also makes use of only half the channels available on drum A. If it is not necessary that the individual shot records be preserved, the full capacity of the drum may be used by following the method described, in conjunction with the apparatus of Fig. 6. In such a method, 10 channels of signal would be alternately recorded on drum A and drum B, for increasing shot numbers.

It will be evident from the description above that the records are adjusted during each compositing operation in such fashion as to make a common datum, the reflected signal, coincide, so that reflections from the same boundaries will substantially coincide for different shots. When so lined up, with the compositing methods described, the reflection signals will add directly, while the noise signals, being out of phase, are diminished in the composite signals. The reflection signals therefore predominate and are more readily picked out from the record tracks which may be made with the recorded composite signals.

Many changes could be made in the methods and apparatus above described without departure from the scope of our invention. Accordingly, this invention is not to be considered limited to the methods and apparatus described, but only by the scope of the appended claims.

We claim:

1. The method of compositing seismic exploration results which includes the steps of sequentially generating vibration waves in the earth at a plurality of locations near each other, detecting said vibration waves at one position spaced from said locations to produce a plurality of electrical signals, one for each wave generated, magnetically recording a predetermined amplitude of the first electrical signal from the first-generated wave, reproducing said first electrical signal, simultaneously with the last-mentioned step combining half of the amplitude of said first electrical signal with a corresponding amplitude of the second electrical signal from the second-generated wave in such fashion that a common datum for both signals is coincident in time so that reflections from the same boundaries will substantially coincide and to produce a first composite electrical signal, magnetically recording said first composite electrical signal; reproducing said first composite electrical signal, simultaneously with the last-mentioned step combining two-thirds the amplitude of the first composite electrical signal with one-third said predetermined amplitude of the third electrical signal from the third-generated wave in such fashion that a common datum for both signals is coincident in time so that reflections from the same boundaries will substantially coincide and to produce a second composite electrical signal, magnetically recording the second composite electrical signal; and repeating the last-mentioned reproducing, combining and recording steps $n-3$ times for $n$ waves generated, combining $1/n$ said predetermined amplitude of the electrical signal from the $n$th wave generated with $$\frac{n-1}{n}$$

the amplitude of the $n-1$ composite electrical signal.

2. Apparatus for compositing seismic exploration results obtained from generation of a plurality of seismic waves in the earth and translation of vibration waves received therefrom at one position into a plurality of geophone signals, comprising a magnetic recorder having a pair of recording and reproducing heads for each geophone whose signals are to be composited, first and second switch means each having a movable contact which are mechanically connected together for simultaneous movement to corresponding $n$ numbered positions and each having a stationary contact for each such position, wherein $n$ is at least 3, a mixing circuit including, for each pair of recording heads, a first and a second resistor connected to receive across them the output of one and the other of said heads, respectively, on playback, said mixing circuit further including a first and a second set of resistors with one end of each resistor of the first set connected to a different even-numbered stationary contact of the first switch means and its other end connected to one end of said first resistor, one end of each resistor of the second set being connected to a different odd-numbered stationary contact of the first switch means other than the first contact and its other end being connected to one end of said second resistor, the movable contacts of said first and second switch means being electrically connected together and to the output of said geophone, whereby the output of said geophone is developed across a pair of series-connected resistors for each position of said first and second switch means except the first position, the odd-numbered contacts of said second switch means being connected to said one head and the even-numbered contacts being connected to said other head.

3. Apparatus as defined in claim 2 including a first and a second modulator having their outputs respectively connected to said one and said other head, a first and a second demodulator having their inputs respectively connected to said one and said other head, said first and second modulators having their inputs respectively connected to the odd-numbered and even-numbered contacts of said second switch means, said first and second demodulators having their outputs respectively connected across said first and second resistors, means for energizing said modulators and demodulators, and third switch means having *n* numbered different positions for *n* waves generated and having a movable contact and a number of stationary contacts corresponding to its numbered positions, the movable contact of said third switch means being connected to said energizing means, the odd-numbered contacts of said third switch means being connected to said first modulator and said second demodulator and the even-numbered contacts of said third switch means being connected to said first demodulator and said second modulator, said third switch means having its movable contact mechanically connected to the movable contacts of said first and second switch means so that their positions correspond.

4. In an apparatus for recording seismic exploration results obtained from generating seismic waves by detonating a shot in a borehole in the earth and translating the waves into an electrical signal at a position spaced from the borehole, a recorder including recording means and means for moving a record member past said recording means, a first geophone for detecting the waves at said position and providing said electrical signal, a second geophone positioned at the upper end of the borehole adjacent thereto, so that the first energy that reaches the second geophone after detonation of the shot represents the transit time of waves passing directly between the shot and the upper end of the borehole, means for combining the output electrical signal of the second geophone with the output electrical signal of the first geophone, means connecting the output from the first geophone to said recording means, and means for disabling said combining means after the first energy from the shot reaches the first geophone, said connecting means including an amplifier having an automatic gain control circuit which supplies an A.G.C. voltage of amplitude corresponding to the input signal reaching the amplifier, and a relay having an operating coil electrically connected to said automatic gain control circuit to receive the A.G.C. voltage, said coil being operable to energize the relay when the A.G.C. voltage reaches a predetermined high level, said combining means including normally-closed contacts of said relay which are opened when said relay is energized.

5. In an apparatus for generating seismic waves in the earth at a plurality of positions and detecting the waves at the surface of the earth at one position, a plurality of shorts disposed in at least one borehole in the earth, means for detonating sequentially each of said shots to generate said waves, said detonating means including a circuit including a source of voltage, said circuit further including switch means operable when actuated to close said circuit and said circuit being opened substantially the moment the shot is detonated, means responsive to opening of said circuit to generate a first voltage indicative of the first break, a magnetic recorder including a recording-reproducing head, a drum mounting the record member rotatable to move said record member past the head, switch means operable when actuated to close said circuit, means for actuating said switch means, one of said switch means and said actuating means being movable with said drum and the other of said switch means and said actuating means being positioned in the path of movement thereof, one of said switch means and said actuating means being adjustable to change the rotational position the drum is in when said switch means is actuated, a first geophone located at said one position operable to translate seismic waves reaching it into electrical signals, one for each shot, a second geophone positioned at the upper end of said one borehole, so that the first energy reaching it for each shot represents the travel time of seismic waves directed between the shot and the surface of the earth, said second geophone being operable to translate the seimic waves reaching it into a second voltage, means for combining said first voltage and said second voltage with said electrical signal, and means responsive to the amplitude of seismic waves reaching the first geophone operable to disable said combining means.

6. The apparatus of claim 5 in which said recorder includes at least two recording and reproducing heads, means for supplying the output of said first geophone alternately to the first and the second of said heads with successive detonations of shots, a mixing circuit, means for connecting the first and second heads alternately to one input of the mixing circuit with said second head being connected to said mixing circuit when said first head is supplied with the output of the first geophone, said mixing circuit being operable to add the output of the head connected to it with the output of the first geophone for all but the first shot detonated.

7. In an apparatus for recording seismic exploration results obtained from generation of seismic waves by detonating a shot in a borehole in the earth and translating the waves into an electrical signal at a position spaced from the borehole, a recorder including recording means and means for moving a record member past said recording means, a first geophone for detecting the waves at said position and for providing said electrical signal, a second geophone positioned at the upper end of the borehole so that the first energy that reaches the second geophone after detonation of the shot represents the transit time of waves passing directly between the shot and the upper end of the borehole, means for combining the output electrical signal of the second geophone with the output electrical signal of the first geophone, means connecting the output from said combining means to said recording means, and means responsive to the amplitude of the energy reaching the first geophone operative when the energy exceeds a predetermined level to disconnect said second geophone from the combining means.

References Cited in the file of this patent

UNITED STATES PATENTS

| | | |
|---|---|---|
| 2,059,018 | North | Oct. 27, 1936 |
| 2,088,588 | Dudley | Aug. 3, 1937 |
| 2,243,730 | Ellis | May 27, 1941 |
| 2,298,020 | Parr | Oct. 6, 1942 |
| 2,317,334 | Shimek | Apr. 20, 1943 |
| 2,340,272 | McCarty | Jan. 25, 1944 |
| 2,450,366 | Williams | Sept. 28, 1948 |
| 2,620,890 | Lee et al. | Dec. 9, 1952 |
| 2,732,906 | Mayne | Jan. 31, 1956 |
| 2,766,837 | McCollum | Oct. 16, 1956 |
| 2,767,389 | McCollum | Oct. 16, 1956 |
| 2,806,545 | Schempf | Sept. 17, 1957 |

OTHER REFERENCES

Handley: "How Magnetic Recording Aids Seismic Operations," Oil and Gas Journal, Jan. 11, 1954, vol. 52, No. 36, pages 158, 159.

Palmer: "A New Approach to Seismic Exploration," World Oil, June 1954, vol. 138, No. 7, pages 140, 142, 146, 148, 151, 152, 154, 156, 158.

UNITED STATES PATENT OFFICE
CERTIFICATE OF CORRECTION

Patent No. 2,902,107                  September 1, 1959

Louis W. Erath et al.

It is hereby certified that error appears in the printed specification of the above numbered patent requiring correction and that the said Letters Patent should read as corrected below.

Column 6, lines 23 and 24, for "representing a mixture of geophone signals, one for each energized at this time. The second composite signal" read -- energized at this time. The second composite signal representing a mixture of geophone signals, one for each --; same column 6, line 41, after "record" insert -- on --; column 8, line 23, for "2" read -- "2" --; line 26, for "4" read -- "4" --; same column 8, line 28, for "3" read -- "3" --; column 11, line 3, for "6.10" read -- 6-10 --; column 13, line 50, for "shorts" read -- shots --.

Signed and sealed this 8th day of November 1960.

(SEAL)
Attest:

KARL H. AXLINE
Attesting Officer

ROBERT C. WATSON
Commissioner of Patents